US011485261B2

(12) United States Patent
Osa et al.

(10) Patent No.: US 11,485,261 B2
(45) Date of Patent: Nov. 1, 2022

(54) COLUMNAR BODY, SEAT FRAME, AND VEHICLE SEAT

(71) Applicant: NHK SPRING CO., LTD., Yokohama (JP)

(72) Inventors: Shunichiro Osa, Yokohama (JP); Junichiro Horii, Yokohama (JP); Takuma Oki, Yokohama (JP); Kousuke Yonemochi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/167,924

(22) Filed: Feb. 4, 2021

(65) Prior Publication Data
US 2021/0245636 A1 Aug. 12, 2021

(30) Foreign Application Priority Data

Feb. 7, 2020 (JP) .............................. JP2020-019956

(51) Int. Cl.
B60N 2/68 (2006.01)
B60R 22/26 (2006.01)

(52) U.S. Cl.
CPC ............... B60N 2/68 (2013.01); B60N 2/688 (2013.01); B60R 22/26 (2013.01)

(58) Field of Classification Search
CPC ... B60N 2/68; B60N 2/686; E04C 2003/0443; E04C 3/32
See application file for complete search history.

(56) References Cited

U.S. PATENT DOCUMENTS

| | | | | |
|---|---|---|---|---|
| 6,341,467 B1* | 1/2002 | Wycech | ................... | E04C 3/29 296/193.06 |
| 8,011,721 B2* | 9/2011 | Yamada | ............... | B62D 29/008 296/209 |
| 8,888,177 B2* | 11/2014 | Kaku | ................. | B60N 2/42709 297/216.13 |
| 9,227,666 B2* | 1/2016 | Yoshioka | ............... | B62D 25/04 |
| 10,384,721 B2* | 8/2019 | Kellner | ................. | B62D 25/20 |
| 10,513,849 B1* | 12/2019 | Pearson | .................... | E04C 3/06 |
| 10,597,864 B1* | 3/2020 | Pearson | .................... | E04B 5/40 |
| 11,027,781 B2* | 6/2021 | Otsuka | ................. | B62D 21/157 |
| 2004/0093825 A1* | 5/2004 | Lee | ........................... | E04C 3/06 52/843 |
| 2005/0077763 A1* | 4/2005 | Kawashima | ........... | B60N 2/682 297/216.14 |
| 2005/0200184 A1* | 9/2005 | Siegrist | .................. | B60N 2/682 297/374 |
| 2012/0068506 A1* | 3/2012 | Yamaki | ................ | B60N 2/7094 297/216.1 |

(Continued)

FOREIGN PATENT DOCUMENTS

| | | | | |
|---|---|---|---|---|
| CA | 2979376 A1 | * | 3/2018 | ............... E04B 1/30 |
| CN | 103991399 A | * | 8/2014 | ............... B60N 2/22 |

(Continued)

Primary Examiner — Timothy J Brindley
(74) Attorney, Agent, or Firm — Dority & Manning, P.A.

(57) ABSTRACT

A columnar body including: plural elongated plate shaped panel members extending in one direction; and plural weld portions where two width direction end portions of respective panel members out of the plural panel members are welded together to configure a closed cross-section.

11 Claims, 10 Drawing Sheets

(56) References Cited

U.S. PATENT DOCUMENTS

| | | | | |
|---|---|---|---|---|
| 2013/0140868 A1* | 6/2013 | Muck | ................... | B60N 2/682 |
| | | | | 297/452.2 |
| 2015/0307005 A1* | 10/2015 | Dill | ..................... | B60N 2/686 |
| | | | | 297/354.1 |
| 2016/0339821 A1* | 11/2016 | Akaike | .................... | B60N 2/68 |
| 2016/0347223 A1* | 12/2016 | Akaike | .................... | B60N 2/22 |
| 2018/0170226 A1* | 6/2018 | Furukawa | ................ | B60N 2/64 |
| 2019/0092201 A1* | 3/2019 | Hasegawa | ................ | B60N 2/22 |

FOREIGN PATENT DOCUMENTS

| | | | | | |
|---|---|---|---|---|---|
| CN | 107965090 | A | * | 4/2018 | |
| CN | 111219016 | A | * | 6/2020 | |
| CN | 112302168 | A | * | 2/2021 | |
| DE | 4423912 | A1 | * | 1/1996 | ............... B60N 2/68 |
| JP | A2011-178194 | | | 9/2011 | |
| WO | WO-2011054034 | A1 | * | 5/2011 | ........... B23K 9/0256 |
| WO | WO-2012091431 | A2 | * | 7/2012 | ............. B60N 2/682 |
| WO | WO-2016140295 | A1 | * | 9/2016 | ............... B60N 2/90 |
| WO | WO-2019058854 | A1 | * | 3/2019 | ............... B60N 2/68 |

* cited by examiner

COLUMNAR BODY, SEAT FRAME, AND VEHICLE SEAT

CROSS-REFERENCE TO RELATED APPLICATION

This application is based on and claims priority under 35 USC 119 from Japanese Patent Application No. 2020-019956 filed on Feb. 7, 2020, the disclosure of which is incorporated by reference herein.

BACKGROUND

Technical Field

The present disclosure relates to a columnar body, a seat frame, and a vehicle seat.

Related Art

Japanese Patent Application Laid-Open (JP-A) No. 2011-178194 discloses an example of a vehicle seat with an integrally provided seatbelt. In vehicle seats with an integrally provided seatbelt, a high strength is demanded of a back side frame of a seatback frame to which a shoulder belt portion of the seatbelt is attached. JP-A No. 2011-178194 discloses a back side frame that has a closed cross-section. This back side frame is formed with a closed cross-section by bending a single metal sheet member into a rectangular profile.

However, since the back side frame (columnar body) disclosed in JP-A No. 2011-178194 is formed by welding together two end portions of a single bent metal sheet, it is difficult to form the closed cross-section with high precision.

SUMMARY

In consideration of the above circumstances, an object of the present disclosure is to provide a columnar body having a closed cross-section formed with high precision.

A columnar body of a first aspect includes plural elongated plate shaped panel members extending in one direction, and plural weld portions where two width direction end portions of respective panel members out of the plural panel members are welded together to configure a closed cross-section.

A columnar body of a second aspect is the columnar body of the first aspect, wherein the plural panel members have different sheet thicknesses to each other.

A columnar body of a third aspect is the columnar body of the first aspect or the second aspect, wherein the plural panel members have different profiles to each other as viewed along the one direction.

A columnar body of a fourth aspect is the columnar body of any one of the first aspect to the third aspect, wherein the two width direction end portions of the respective panel members are lap welded to one another.

A columnar body of a fifth aspect is the columnar body of any one of the first aspect to the fourth aspect, wherein at least one panel member out of the panel members is formed with a bead portion extending in the one direction.

A columnar body of a sixth aspect is the columnar body of the fifth aspect, wherein at least one weld portion out of the plural weld portions is disposed inside the closed cross-section.

A seat frame of a seventh aspect includes a cushion frame provided with a pair of left and right cushion side frames extending along a seat front-rear direction and disposed in a pair at two seat width direction end portions of the cushion frame, and a seatback frame provided with the columnar body of any one of the first aspect to the sixth aspect as at least one back side frame out of a left and right pair of back side frames. The columnar body has one end portion in the one direction coupled to a rear end portion of the corresponding cushion side frame.

A seat frame of an eighth aspect is the seat frame of the seventh aspect, wherein the plural panel members include a rear panel configuring a structure of a portion of the back side frame at a rear side of the seatback frame, an outer panel configuring a structure of a portion of the back side frame at a width direction outside of the seatback frame, and an inner panel configuring a structure of a portion of the back side frame at a front side and a width direction inside of the seatback frame. The inner panel includes a taper portion inclined toward the width direction inside of the seatback frame on progression from the front side toward the rear side of the seatback frame.

A seat frame of a ninth aspect is the seat frame of the seventh aspect or the eighth aspect, wherein the seatback frame curves so as to protrude toward a front side of the seatback frame as viewed along the seat width direction.

A vehicle seat of a tenth aspect includes a cushion section, and the seat frame of any one of the seventh aspect to the ninth aspect supporting the cushion section.

The columnar body of the first aspect enables variation in the weld portions to be reduced, such that the closed cross-section is formed with good precision in comparison to a columnar body provided with a configuration in which a single panel member is bent and welded together at two end portions.

In the columnar body of the second aspect, varying the sheet thicknesses of specific panel members enables a specific location to be set with comparatively higher strength or comparatively lower strength than other locations. Moreover, a more lightweight columnar body can be attained while securing the required strength.

In the columnar body of the third aspect, varying the size of the closed cross-section at specific locations as viewed along a length direction of the columnar body enables strength at the specific locations of the columnar body to be varied.

The columnar body of the fourth aspect enables leeway in dimensional tolerance, thereby facilitating dimensional management of the closed cross-section during welding.

The columnar body of the fifth aspect enables bending strength to be increased, such that the columnar body is less liable to deform.

The columnar body of the sixth aspect enables the columnar body to monopolize less space than in configurations in which all of the weld portions are disposed outside the closed cross-section.

The seat frame of the seventh aspect facilitates formation of the complex profile of seat frame in comparison to configurations in which a back side frame is formed by bending a single sheet member into a rectangular profile as viewed along the one direction.

The seat frame of the eighth aspect enables a space to be enlarged at the width direction inside of the seat frame in comparison to configurations in which a front side and seat width direction inside portion of the inner panel has a right-angled profile as viewed along the one direction.

The seat frame of the ninth aspect enables a space to be enlarged at the rear side of the seatback frame in comparison to configurations in which the seatback frame has a profile extending in a straight line.

The vehicle seat of the tenth aspect facilitates formation of the complex profile of the vehicle seat in comparison to configurations in which the back side frame is formed by bending a single sheet member into a rectangular profile as viewed along the one direction.

BRIEF DESCRIPTION OF THE DRAWINGS

Exemplary embodiments of the present disclosure will be described in detail based on the following figures, wherein.

DETAILED DESCRIPTION

Figure 1:
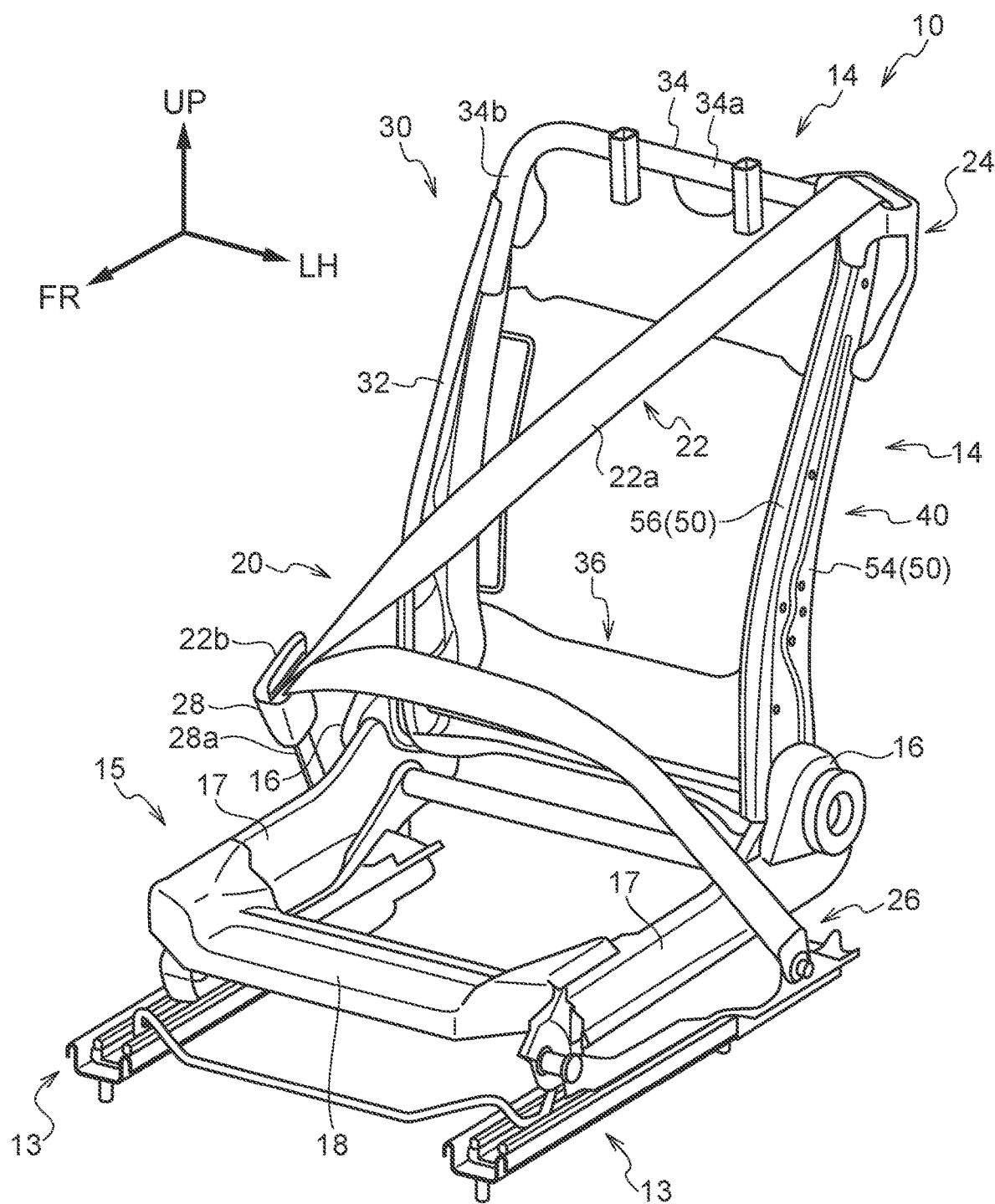
FIG. 1 is a perspective view illustrating a vehicle seat according to an exemplary embodiment.

Explanation follows regarding an integrated seatbelt-type vehicle seat according to an exemplary embodiment of the present disclosure, with reference to the drawings. In the drawings, the arrow FR indicates a vehicle seat front side, the arrow UP indicates a vehicle seat upper side, and the arrow LH indicates a vehicle seat left side. Unless specifically stated otherwise, reference to front and rear, upward and downward, and left and right directions refers to the front and rear in a front-rear direction of the vehicle seat, upward and downward in an up-down direction of the vehicle seat, and left and right in a left-right direction of the vehicle seat (a seat width direction).

Vehicle Seat Configuration

First, explanation follows regarding a configuration of the integrated seatbelt-type vehicle seat according to the present exemplary embodiment.

Vehicle Seat

Figure 7:
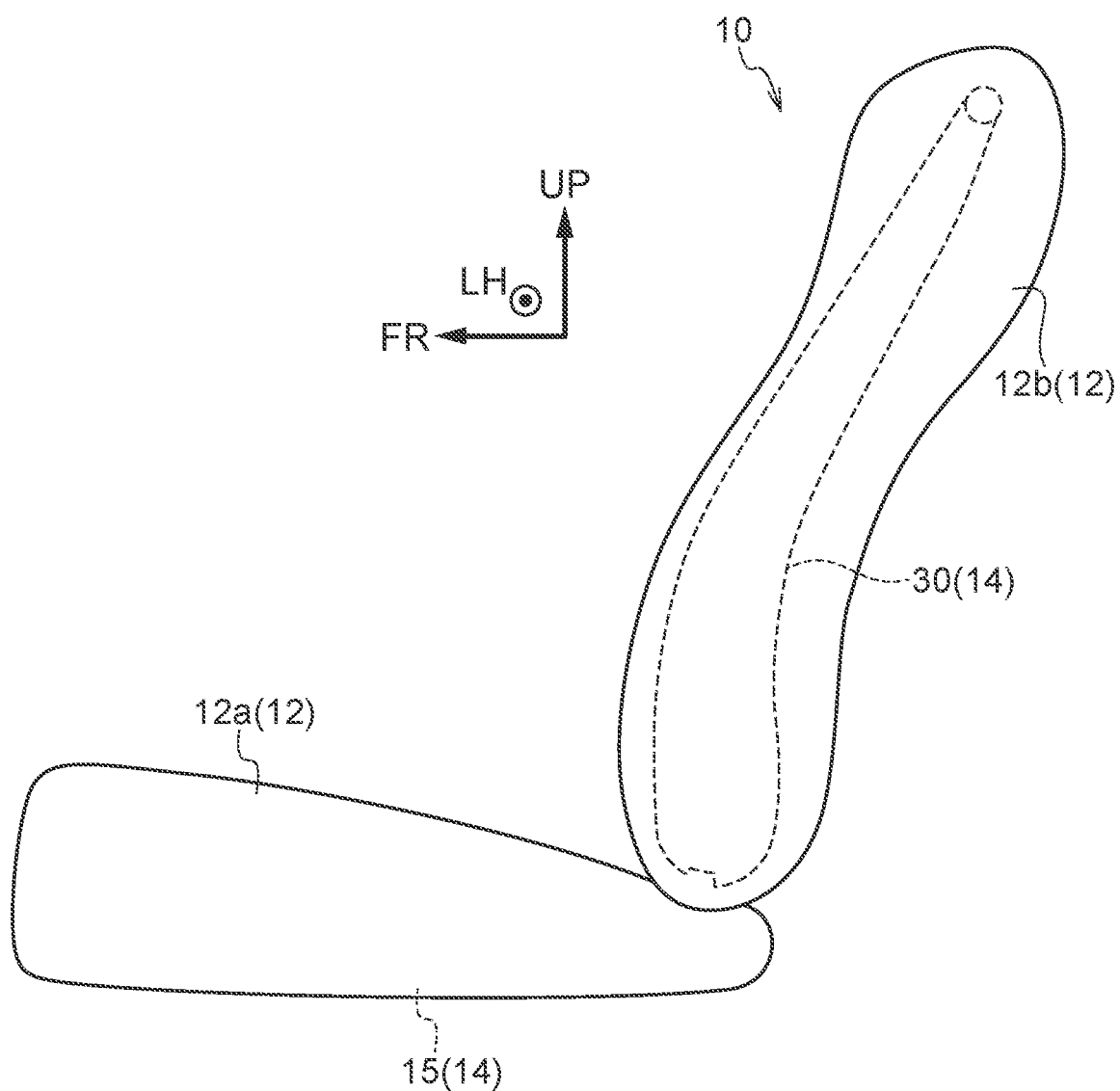
FIG. 7 is a side view illustrating a vehicle seat according to an exemplary embodiment as viewed from a width direction left side.

As illustrated in FIG. 1, an integrated seatbelt-type vehicle seat (referred to hereafter as a vehicle seat) 10 according to the present exemplary embodiment is installed as a vehicle seat on the left side of a front section of a vehicle. The vehicle seat 10 includes a cushion section 12 (see FIG. 7) that contacts an occupant, and a seat frame 14 that supports the cushion section 12 from within. The vehicle seat 10 further includes bases 13 that are disposed between the seat frame 14 and a vehicle body floor section so as to support a cushion frame 15 of the seat frame 14, described later, and a seatbelt device 20 configured to restrain the occupant. As illustrated in FIG. 7, the cushion section 12 is configured including a seat cushion 12a, configuring a seating portion for the occupant, and a seatback cushion 12b to support the back of the occupant. Note that the vehicle seat according to the present exemplary embodiment may also be installed as a vehicle seat on the right side of the vehicle front section, or installed as a vehicle seat in a rear section of the vehicle. In cases in which the vehicle seat according to the present exemplary embodiment is installed on the right side of the vehicle, positional relationships in the configuration of the vehicle seat will be symmetrically flipped in a vehicle width direction with respect to those in the configuration of the vehicle seat 10.

As illustrated in FIG. 1, the seat frame 14 includes the cushion frame 15 (see FIG. 7) that supports the seat cushion 12a from within, brackets 16, and a seatback frame 30 (see FIG. 7) that supports the seatback cushion 12b from within.

The cushion frame 15 is configured including a pair of cushion side frames 17, and a front frame 18. The cushion side frames 17 are disposed in a pair at two seat width direction end portions of the cushion frame 15, and are configured by plate shaped members standing upright in the seat up-down direction and extending along the seat front-rear direction. The front frame 18 is disposed at a front end portion of the cushion frame 15, and is a member that extends in the seat width direction so as to couple together the pair of cushion side frames 17. Note that the seat front-rear direction and the seat width direction respectively indicate the same directions as a vehicle front-rear direction and the vehicle width direction.

The brackets 16 are disposed at rear end portions of the respective cushion side frames 17, and are members that rotatably couple together the cushion side frames 17 and either a back side frame 32 or a back side frame 40 of the seatback frame 30, described later. Note that for ease of explanation, in the present exemplary embodiment it is assumed that the seatback frame 30 is oriented so as to extend along the seat up-down direction from the cushion frame 15. Note that the seat up-down direction indicates the same direction as a vehicle up-down direction.

The seatback frame 30 of the present exemplary embodiment includes the back side frame 32 coupled to the right bracket 16, and the back side frame 40 coupled to the left bracket 16. The seatback frame 30 further includes an upper frame 34 disposed so as to span between upper end portions of the back side frames 32, 40, and a rear seat panel 36 disposed so as to span between rear lower end portions of the back side frames 32, 40. The back side frame 32 is a member that is for example configured from sheet metal and that extends along a direction following the seat up-down direction. The rear seat panel 36 is a member that is for example configured from sheet metal, and that lies in a plane following the back side frames 32, 40. The upper frame 34 is a member that is for example configured by a metal pipe, and that has an L-shaped profile. Specifically, the upper frame 34 has a shape that extends to the right from an upper end portion of the back side frame 40 toward the back side frame 32 side, and that bends toward the back side frame 32 from above the back side frame 32.

The back side frame 32, the back side frame 40, and the rear seat panel 36 are curved so as to protrude toward the seat front-rear direction front side as viewed along the seat width direction. The seatback frame 30 is thus curved so as to protrude the seat front-rear direction front side as viewed along the seat width direction. Note that the back side frame 40 will be described in detail later.

The seatbelt device 20 includes a three-point seatbelt section (referred to hereafter as the seatbelt section) 22, a retractor 24, a belt bracket 26, a buckle 28, and a buckle bracket 28a. The seatbelt section 22 includes a belt 22a and a tongue plate 22b through which the belt 22a is inserted. The retractor 24 is disposed at a rear upper end portion of the back side frame 40 of the seatback frame 30, and anchors one end of the belt 22a in a state allowing the belt 22a to be taken up and pulled out. The belt bracket 26 is disposed on the base 13 on the back side frame 40 side of the front frame 18, and anchors one end of the belt 22a on the opposite side of the belt 22a to the side anchored by the retractor 24. The buckle bracket 28a is disposed on the base 13 on the back side frame 32 side of the front frame 18, and is a member that supports the buckle 28 in a manner allowing coupling of the buckle 28 to the tongue plate 22b. The tongue plate 22b and the buckle 28 of the seatbelt device 20 are coupled together in a state in which the belt 22a has been pulled out and drawn across the occupant, thereby fitting the belt 22a over the occupant and thus restraining the occupant.

Back Side Frame 40

Next, explanation follows regarding the back side frame 40.

Figure 2:
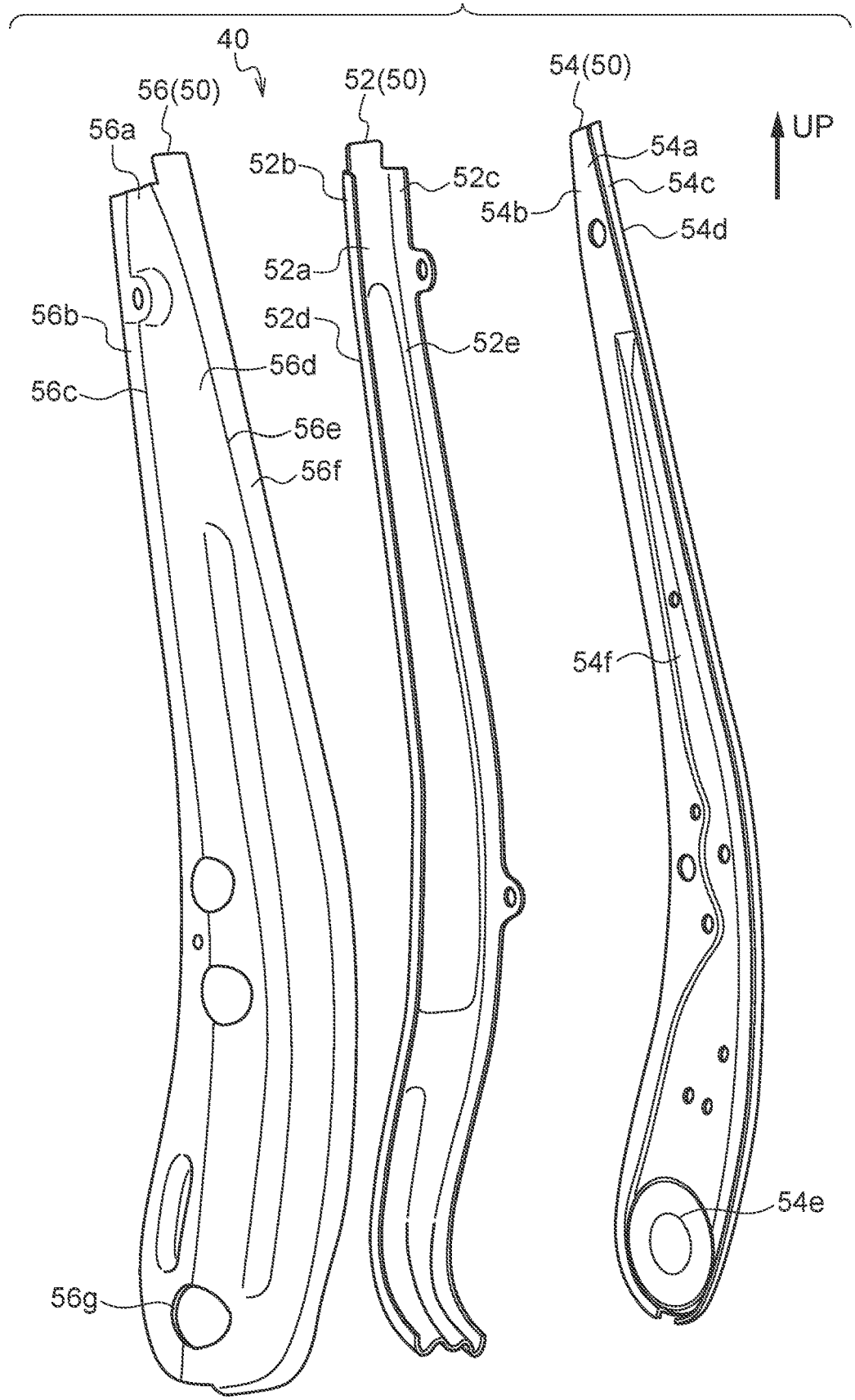
FIG. 2 is an exploded perspective view illustrating a back side frame according to an exemplary embodiment.
Figure 3:
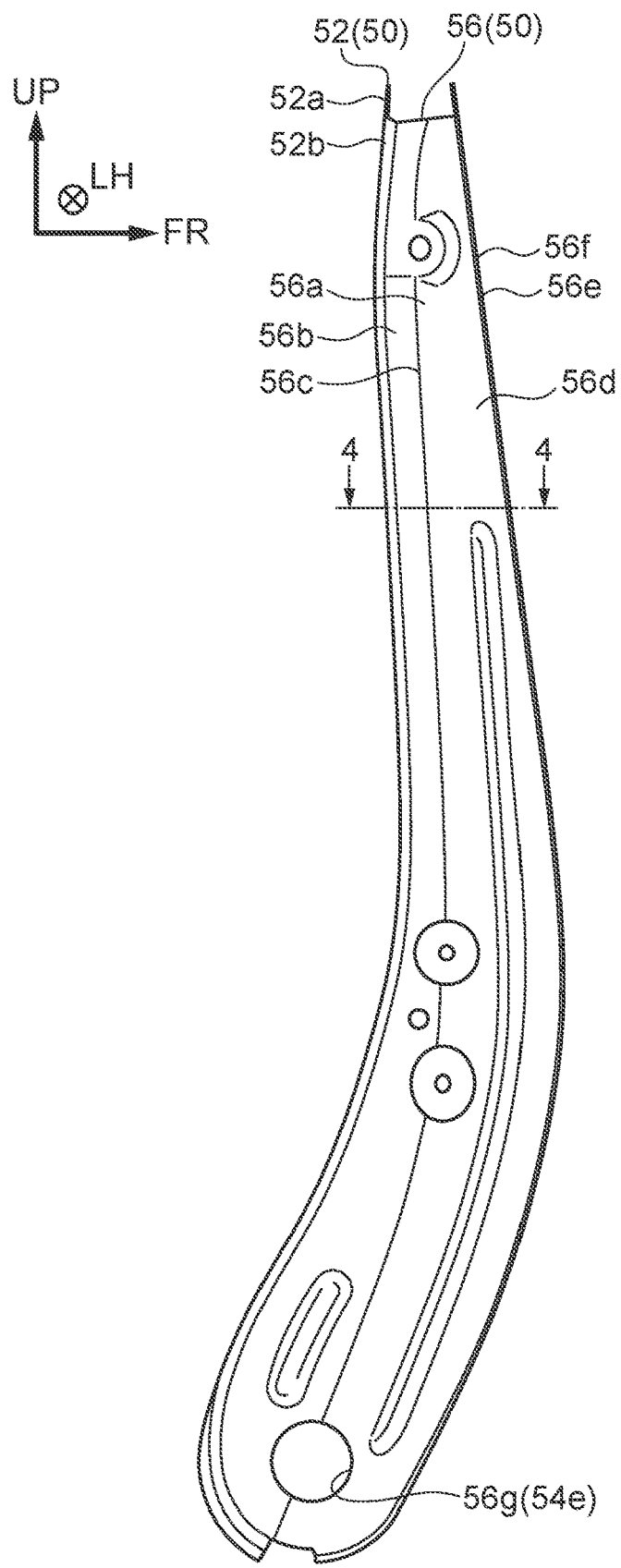
FIG. 3 is a side view illustrating a back side frame according to an exemplary embodiment, as viewed from a width direction right side.

As illustrated in FIG. 2 and FIG. 3, the back side frame 40 is a member with a hollow structure that extends along the seat up-down direction. In the present exemplary embodiment, a seat up-down direction length of the back side frame 40 is longer than a seat up-down direction length of the back side frame 32 (see FIG. 1). The back side frame 40 is an example of a columnar body.

Figure 4:
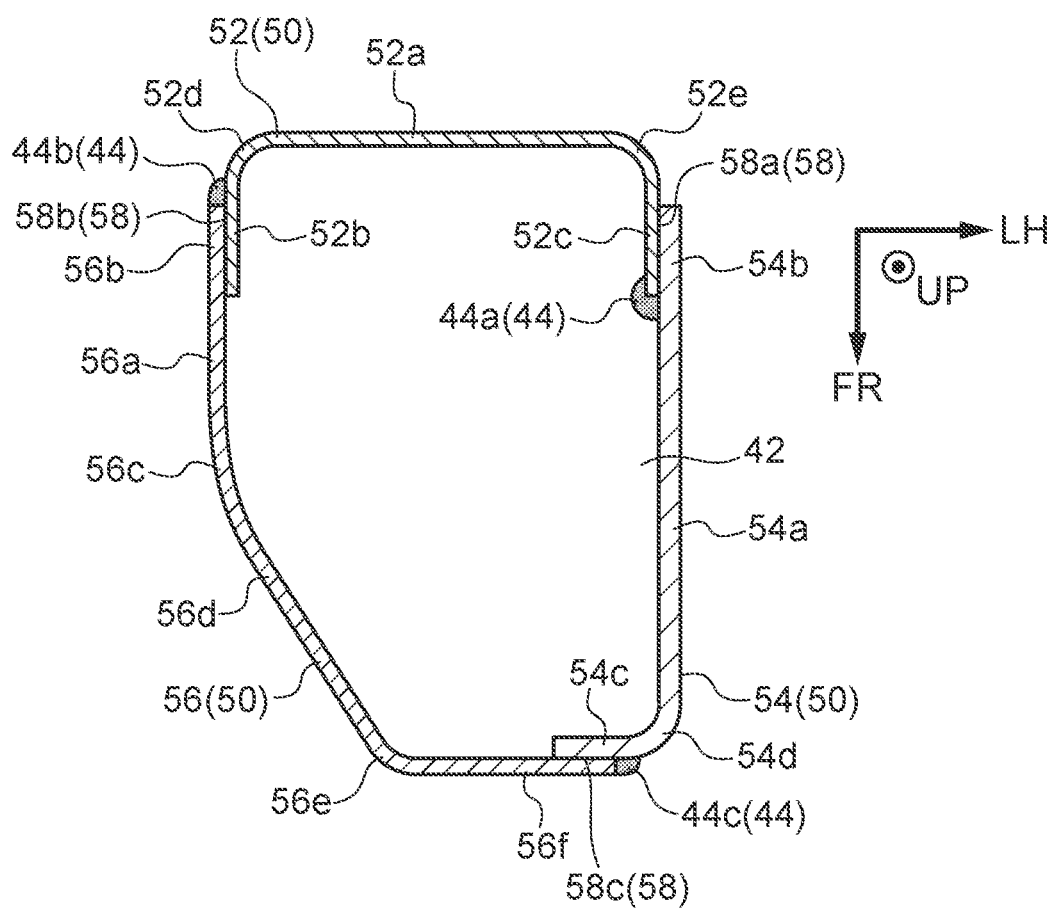
FIG. 4 is a plan view cross-section sectioned along line 4-4 in FIG. 3.

As illustrated in FIG. 2, the back side frame 40 is configured including three elongated plate shaped panel members 50 that extend in a direction along the seat up-down direction. As illustrated in FIG. 4, the back side frame 40 further includes three contact portions 58, three weld portions 44, and a closed cross-section 42. The three panel members 50 are for example each configured from sheet metal. The three panel members each has a bent profile as viewed along the seat up-down direction, and have different profiles to each other as viewed along the seat up-down direction. The three panel members 50 are each disposed adjacently to the other panel members 50 as viewed along the seat up-down direction. The three contact portions 58 are locations where the three panel members 50 contact the mutually adjacent panel members as viewed along the seat up-down direction. The three weld portions 44 are locations formed along the three contact portions 58 during a welding process to join the mutually adjacent panel members out of the three panel members 50 together. The closed cross-section 42 is a location enclosed by the three mutually adjacent and mutually contacting panel members 50 as viewed along the seat up-down direction. In other words, the three mutually adjacent panel members 50 contact each other as viewed along the seat up-down direction, thus forming the closed cross-section 42 of the back side frame 40. Namely, two width direction end portions of the respective panel members are welded together at each of the weld portions 44 so as to configure the closed cross-section 42. The back side frame 40 is therefore a member with a hollow structure as described above. The three panel members 50 are, respectively, a rear panel 52, an outer panel 54, and an inner panel 56. The three contact portions 58 are, respectively, a contact portion 58a between the rear panel 52 and the outer panel 54, a contact portion 58b between the inner panel 56 and the rear panel 52, and a contact portion 58c between the inner panel 56 and the outer panel 54. The three weld portions 44 are, respectively, a weld portion 44a between the outer panel 54 and the rear panel 52, a weld portion 44b between the inner panel 56 and the rear panel 52, and a weld portion 44c between the inner panel 56 and the outer panel 54.

As illustrated in FIG. 4, the rear panel 52 is a member disposed at the seat front-rear direction rear side of the back side frame 40. The rear panel 52 has a C-shaped cross-section profile opening toward the front as viewed along the seat up-down direction. Specifically, the rear panel 52 includes a plate shaped body 52a extending in the seat width direction, a bent portion 52d disposed at a right end of the body 52a, and an end portion 52b projecting toward the front from the bent portion 52d. The rear panel 52 further includes a bent portion 52e disposed at a left end of the body 52a, and an end portion 52c projecting toward the front from the bent portion 52e.

The outer panel 54 is a member disposed on the seat width direction left side of the back side frame 40. As viewed from above, the outer panel 54 has an inverted L-shaped cross-section profile extending toward the rear, and includes a plate shaped body 54a extending in the seat front-rear direction, and a bent portion 54d disposed at a front end of the body 54a. The outer panel 54 further includes an end portion 54c projecting from the bent portion 54d toward the right, and a rear side end portion 54b of the body 54a. The rear side end portion 54b of the outer panel 54 is superimposed on and contacts the end portion 52c of the rear panel 52 so as to cover the end portion 52c from the left side.

As illustrated in FIG. 2, the outer panel 54 further includes a bead portion 54f and a hinge hole 54e. The bead portion 54f projects toward the end portion 54c side with respect to a panel face of the body 54a as viewed along the seat up-down direction, and is configured by a depression extending in a direction following the seat up-down direction. In other words, the bead portion 54f projects toward the inside of the closed cross-section 42 of the back side frame 40 with respect to the panel face of the body 54a. The bead portion 54f is integrally formed to the outer panel 54 by pressing, for example. The hinge hole 54e is a through hole with its axis along the seat width direction that is formed through a lower end portion of the body 54a.

As illustrated in FIG. 4, the inner panel 56 is a member disposed at the seat width direction right side and at the seat front-rear direction front side of the back side frame 40. The inner panel 56 includes a body 56a, an end portion 56b on the rear side as viewed along the seat up-down direction, a bent portion 56c, a taper portion 56d, a bent portion 56e, and an end portion 56f on the front side as viewed along the seat up-down direction.

As viewed along the seat up-down direction, the body 56a of the inner panel 56 is plate shaped and extends along the seat front-rear direction, and the end portion 56b at the rear side of the body 56a is superimposed on and contacts the end portion 52b of the rear panel 52 so as to cover the end portion 52b from the right side. A leading end of the end portion 56b is superimposed on a leading end of the end portion 52b of the rear panel 52 in the seat width direction as viewed along the seat up-down direction. The bent portion 56c is a location of the body 56a positioned further toward the front than the end portion 56b as viewed along the seat up-down direction, and further toward the rear than the end portion 54c of the outer panel 54. The taper portion 56d is a location where the body 56a extends toward the front after having been bent toward the left side with respect to the end portion 56b at the bent portion 56c as viewed along the seat up-down direction. In other words, as viewed along the seat up-down direction, the taper portion 56d is inclined toward the seat width direction inside of the seatback frame 30 on progression from the front side toward the rear side of the seatback frame 30. The bent portion 56e is a location where the taper portion 56d intersects an imaginary plane following a front side face of the end portion 54c of the outer panel 54 in the seat width direction as viewed along the seat up-down direction. The end portion 56f is a location where the body 56a extends toward the seat width direction left side as viewed along the seat up-down direction after bending with respect to the taper portion 56d at the bent portion 56e. The end portion 56f is superimposed on and contacts the end portion 54c of the outer panel 54 so as to cover the end portion 54c from the front side as viewed along the seat up-down direction. A leading end portion of the end portion 56f is positioned further toward the left side than the end portion 54c of the outer panel 54 as viewed along the seat up-down direction.

As illustrated in FIG. 2, the inner panel 56 includes a hinge hole 56g. The hinge hole 56g is a through hole with its axis along the seat width direction formed through the inner panel 56 so as to oppose the hinge hole 54e of the outer panel 54 in the seat width direction. The hinge hole 56g is positioned coaxially to the hinge hole 54e of the outer panel 54.

The rear panel 52, the outer panel 54, and the inner panel 56 each have different sheet thicknesses to each other. Note that the sheet thickness of the outer panel 54 is thicker than the sheet thickness of the rear panel 52 and the sheet thickness of the inner panel 56.

The rear panel 52, the outer panel 54, and the inner panel 56 are curved so as to protrude toward the seat front-rear direction front side as viewed along the seat width direction. The back side frame 40 thus curves so as to protrude toward the seat front-rear direction front side as previously described.

The rear panel 52, the outer panel 54, and the inner panel 56 are each for example formed by being bent in a pressing process.

The back side frame 40 is rotatably coupled to the left bracket 16 through the hinge hole 56g of the inner panel 56 and the hinge hole 54e of the outer panel 54.

In the present exemplary embodiment, the three panel members 50 are superimposed on the mutually adjacent panel members 50 in the sheet thickness directions of the panel members as viewed along the seat up-down direction. In other words, the three contact portions 58 are locations where the three panel members 50 are superimposed and contact on the mutually adjacent panel members 50 in the sheet thickness directions of the panel members 50 as viewed along the seat up-down direction. Specifically, the contact portion 58a is a location where the end portion 54b of the outer panel 54 and the end portion 52c of the rear panel 52 are superimposed and contact each other in the sheet thickness directions of the end portions 54b, 52c. The contact portion 58b is a location where the end portion 56b of the inner panel 56 and the end portion 52b of the rear panel 52 are superimposed and contact each other in the sheet thickness directions of the end portions 56b, 52b. The contact portion 58c is a location where the end portion 56f of the inner panel 56 and the end portion 54c of the outer panel 54 are superimposed and contact each other in the sheet thickness directions of the end portions 56f, 54c.

Figure 5:
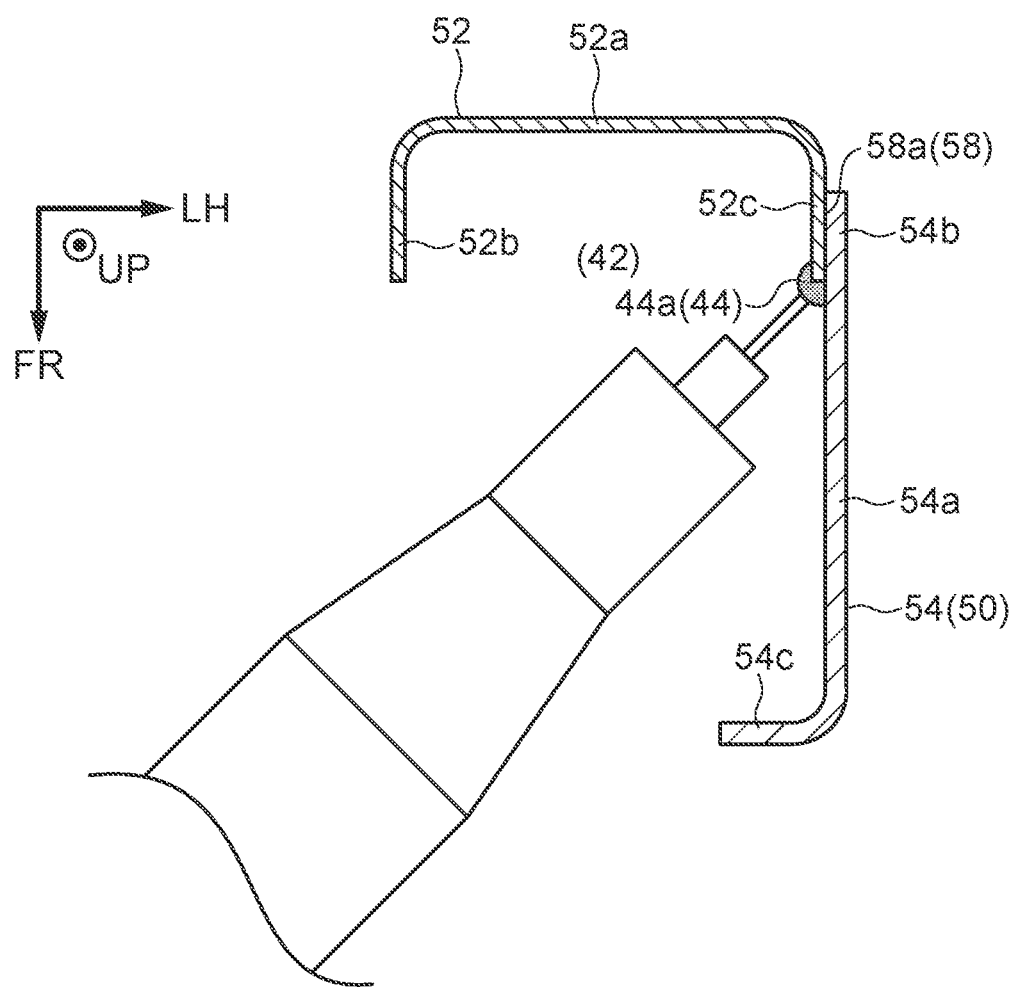
FIG. 5 is a plan view cross-section illustrating a first process of a welding process of a back side frame according to an exemplary embodiment.
Figure 6:
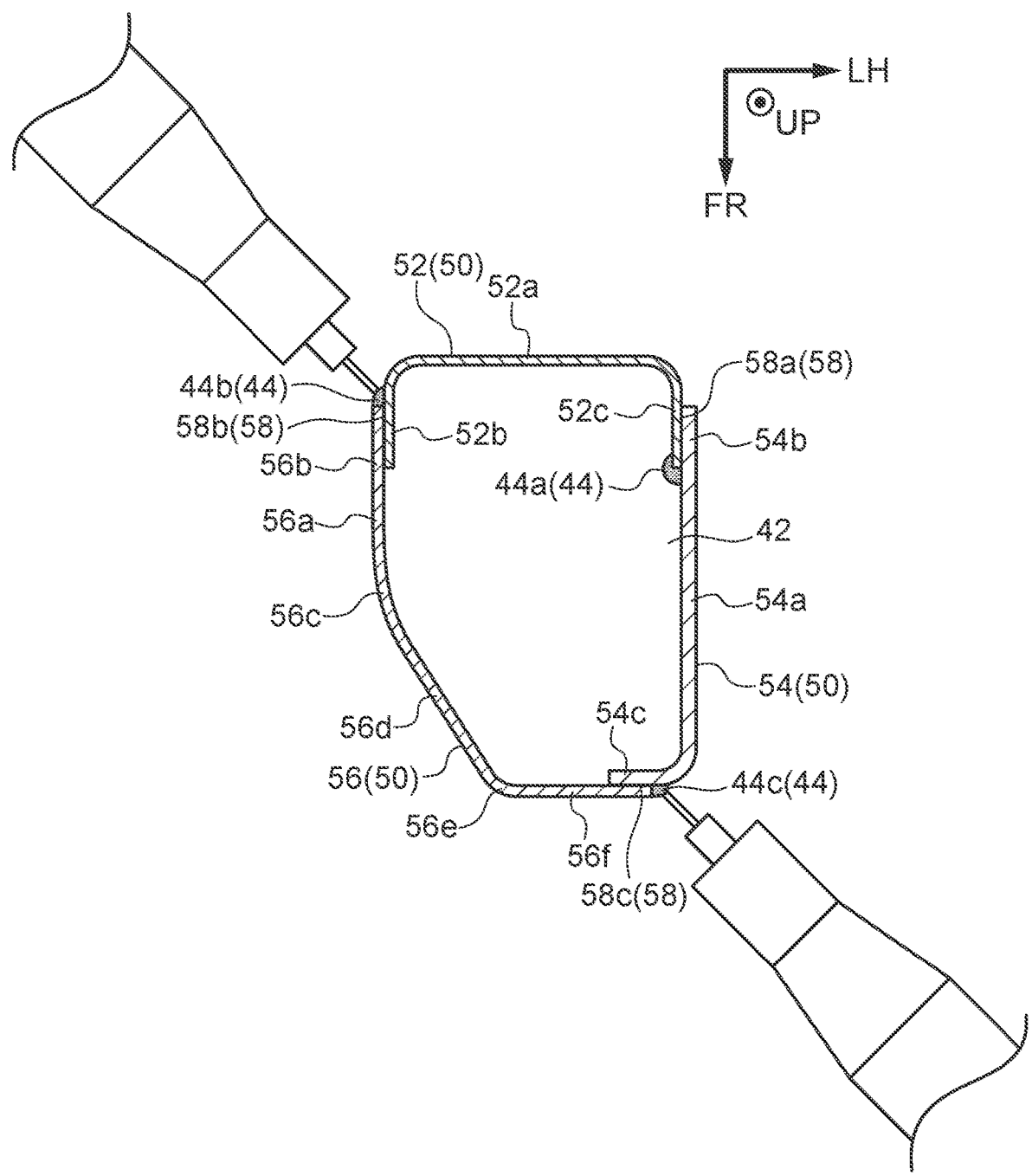
FIG. 6 is a plan view cross-section illustrating a second process of a welding process of a back side frame according to an exemplary embodiment.

The welding process of the back side frame 40 includes a first process in which the rear panel 52 and the outer panel 54 are joined together by welding to form a joined body, and a second process in which the joined body formed in the first process and the inner panel 56 are joined together by welding. As illustrated in FIG. 5, in the first process, the rear panel 52 and the outer panel 54 are disposed at predetermined positions of the back side frame 40 using a jig or the like and then joined together by welding along the contact portion 58a from the rear panel 52 side. The weld portion 44a between the rear panel 52 and the outer panel 54 is thus formed on the rear panel 52 side, thereby forming the joined body configured of the rear panel 52 and the outer panel 54. In other words, the weld portion 44a is disposed on the inside of the closed cross-section 42 of the back side frame 40 in the welding process. Following the first process, in the second process, first as illustrated in FIG. 6, the inner panel 56 is disposed at a predetermined position of the back side frame 40 with respect to the joined body configured of the rear panel 52 and the outer panel 54 using a jig or the like. The rear panel 52, the outer panel 54, and the inner panel 56 are then joined together by welding along the contact portion 58b and the contact portion 58c from the inner panel 56 side. The weld portion 44b between the inner panel 56 and the rear panel 52 and the weld portion 44c between the inner panel 56 and the outer panel 54 are thus both formed on the inner panel 56 side. In other words, the weld portion 44b and the weld portion 44c are disposed at the outside of the closed cross-section 42 of the back side frame 40 in the welding process. The two width direction end portions of respective panel members out of the three panel members 50 are thus lap welded together.

Operation and Advantageous Effects

Next, explanation follows regarding operation and advantageous effects of the present exemplary embodiment.

The back side frame 40 of the present exemplary embodiment is provided with a configuration (first configuration) including the three weld portions 44 where the two width direction end portions of respective panel members out of the three panel members 50 are welded together to configure the closed cross-section 42. The back side frame 40 provided with this first configuration will now be contrasted against a back side frame 140 of a comparative embodiment, described below. Note that where configuration elements and so on employed in the comparative embodiment are common to those employed in the back side frame 40 of the present exemplary embodiment, such components and the like are allocated the same names and reference numerals in the following explanation.

Figure 8:
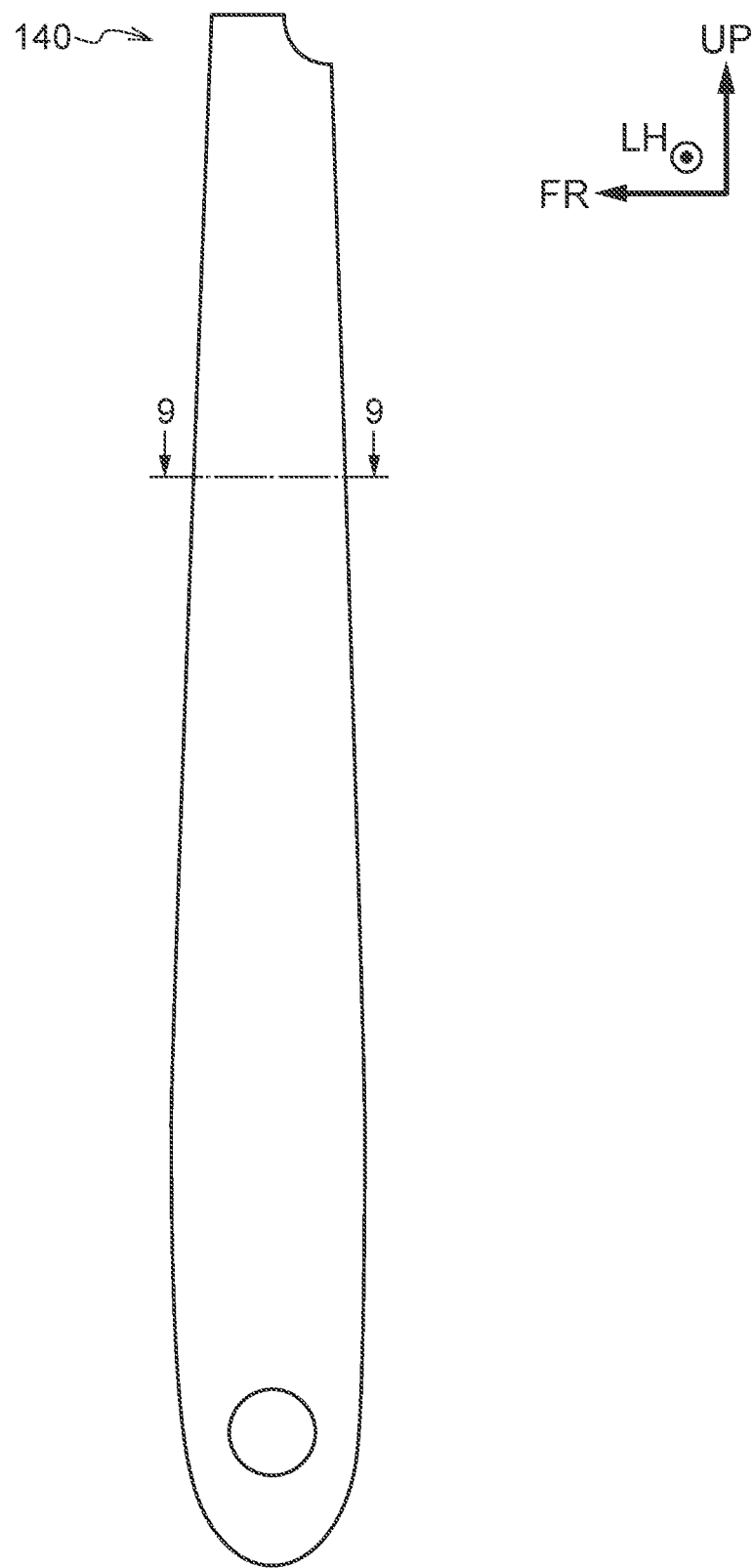
FIG. 8 is a side view illustrating a back side frame of a comparative embodiment to an exemplary embodiment as viewed from a width direction right side.
Figure 9:
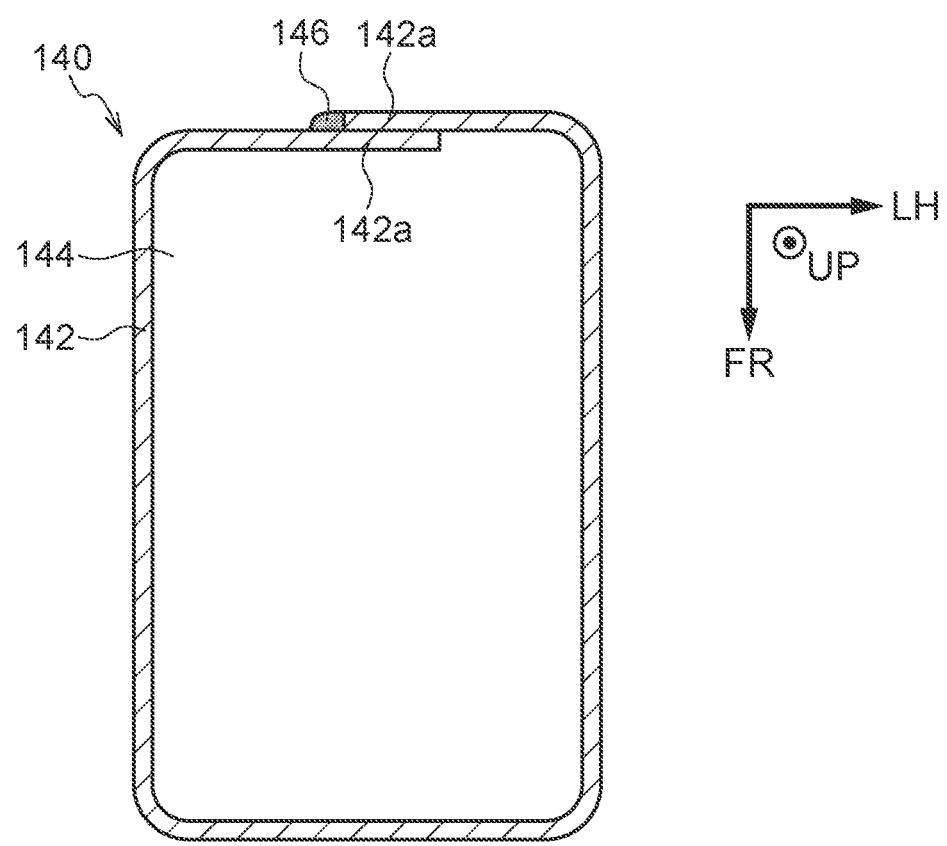
FIG. 9 is a plan view cross-section sectioned along line 9-9 in FIG. 8.

As illustrated in FIG. 8, the back side frame 140 of the comparative embodiment is a member extending in a direction along the seat up-down direction. As illustrated in FIG. 9, the back side frame 140 has a profile configured by bending a single metal sheet 142 into a rectangular profile as viewed along the seat up-down direction. The back side frame 140 is thus formed with a closed cross-section 144 enclosed by the metal sheet 142. The sheet thickness of the metal sheet 142 is uniform and substantially the same as the sheet thickness of the outer panel 54. Two end portions 142a of the metal sheet 142 as viewed along the seat up-down direction are superimposed on and contact each other in the sheet thickness direction, and are joined together at a weld portion 146 formed along the end portions 142a at the outside of the closed cross-section 144. The back side frame 140 extends in a straight line along the seat up-down direction as viewed along the seat width direction. In other words, the back side frame 140 is not curved so as to protrude toward the front side or the rear side as viewed along the seat width direction. With the exception of the points discussed above, the back side frame 140 of the comparative embodiment has a similar configuration to that of the back side frame 40 of the present exemplary embodiment.

The back side frame 140 of the comparative embodiment is formed by bending the single metal sheet 142 as viewed along the seat up-down direction and welding together the two end portions of the metal sheet 142. It is therefore difficult to form the closed cross-section 144 of the back side frame 140 with good precision.

On the other hand, the back side frame 40 of the present exemplary embodiment is provided with the first configuration, namely a configuration in which the two width direction end portions of respective panel members out of the three panel members 50 that have been respectively bent into the profiles of the rear panel 52, the outer panel 54, and the inner panel 56 are welded together at the three weld portions 44. So doing enables variation in welding at the closed cross-section to be reduced, enabling the closed cross-section 42 to be formed with good precision. Employing the first configuration enables the closed cross-section 42 of the back side frame 40 that is provided with the first configuration to be formed with better precision than in the comparative embodiment. In particular, the back side frame 40 that is provided with the first configuration enables the closed cross-section 42 to be formed with good precision, even when using high-tensile sheet steel as a high strength material for the panel members 50.

The back side frame 40 of the present exemplary embodiment is also provided with a configuration (second configuration) in which the rear panel 52, the outer panel 54, and the inner panel 56 have different sheet thicknesses different to each other. By varying the sheet thicknesses of specific panel members 50, specific locations of the back side frame 40 can be set with comparatively higher strength or comparatively lower strength than other locations thereof.

In the present exemplary embodiment, the sheet thickness of the outer panel 54 is greater than the sheet thickness of the rear panel 52 and the sheet thickness of the inner panel 56. In other words, the sheet thickness of the rear panel 52 and the sheet thickness of the inner panel 56 are thinner than the sheet thickness of the outer panel 54. The side frame is provided to an integrated seatbelt-type vehicle seat, and has a hollow structure (closed cross-section) in which the retractor 24 is disposed, and thus should not deform easily in response to load acting in the direction along which the belt 22a is drawn across. In particular, a greater sheet thickness is demanded at a location on the seat width direction outside of the sheet metal configuring the side frame that has a hollow structure (closed cross-section). Accordingly, the back side frame 40 of the present exemplary embodiment is capable of achieving a more lightweight back side frame 40 while securing the required strength with respect to load acting in the direction along which the belt 22a is drawn across. Moreover, in the back side frame 40 of the present exemplary embodiment, the sheet thickness of the rear panel 52 and the sheet thickness of the inner panel 56 are thinner than the sheet thickness of the outer panel 54, thereby facilitating molding of the rear panel 52 and the inner panel 56.

Moreover, a configuration (third configuration) is provided in which the three panel members 50 of the present exemplary embodiment have different profiles to each other as viewed along the seat up-down direction. Accordingly, the back side frame 40 of the exemplary embodiment enables the strength of specific locations of the closed cross-section 42 of the back side frame 40 to be varied by varying the size of these specific locations as viewed from a direction along the seat up-down direction.

The back side frame 40 of the present exemplary embodiment is further provided with a configuration (fourth configuration) in which the two width direction end portions of respective panel members out of the three panel members 50 are lap welded together. The back side frame 40 of the exemplary embodiment thereby enables leeway in dimensional tolerance, thereby facilitating dimensional management of the closed cross-section 42 during welding.

The back side frame 40 of the present exemplary embodiment is further provided with a configuration (fifth configuration) in which the outer panel 54 is formed with the bead portion 54f extending along the seat up-down direction. This increases the bending strength of the back side frame 40, enabling the back side frame 40 of the present exemplary embodiment to be made less liable to deform.

The back side frame 40 of the present exemplary embodiment is further provided with a configuration (sixth configuration) in which the weld portion 44a is disposed inside the closed cross-section 42. Thus, in the back side frame 40 provided with the sixth configuration, the back side frame 40 monopolizes less space and results in fewer external projections projecting outside the closed cross-section 42 with respect to panel faces than in configurations in which all of the weld portions 44 are disposed outside the closed cross-section 42. In particular, it is preferable to have fewer external projections on members configuring the vehicle seat since this reduces the risk of the vehicle seat impinging on the occupant.

The seat frame 14 including the back side frame 40 that is provided with the first configuration facilitates formation of the complex profile of the seat frame 14 in comparison to configurations including the back side frame 140 of the comparative embodiment.

The seat frame 14 of the present exemplary embodiment is further provided with a configuration (seventh configuration) in which the inner panel 56 is formed with the taper portion 56d. The seat frame 14 provided with the seventh configuration is thus capable of enlarging a space at the width direction inside of the seat frame in comparison to configurations in which a front side and seat width direction inside portion of the inner panel 56 has a right-angled profile as viewed along the seat up-down direction (see FIG. 9).

Figure 10:
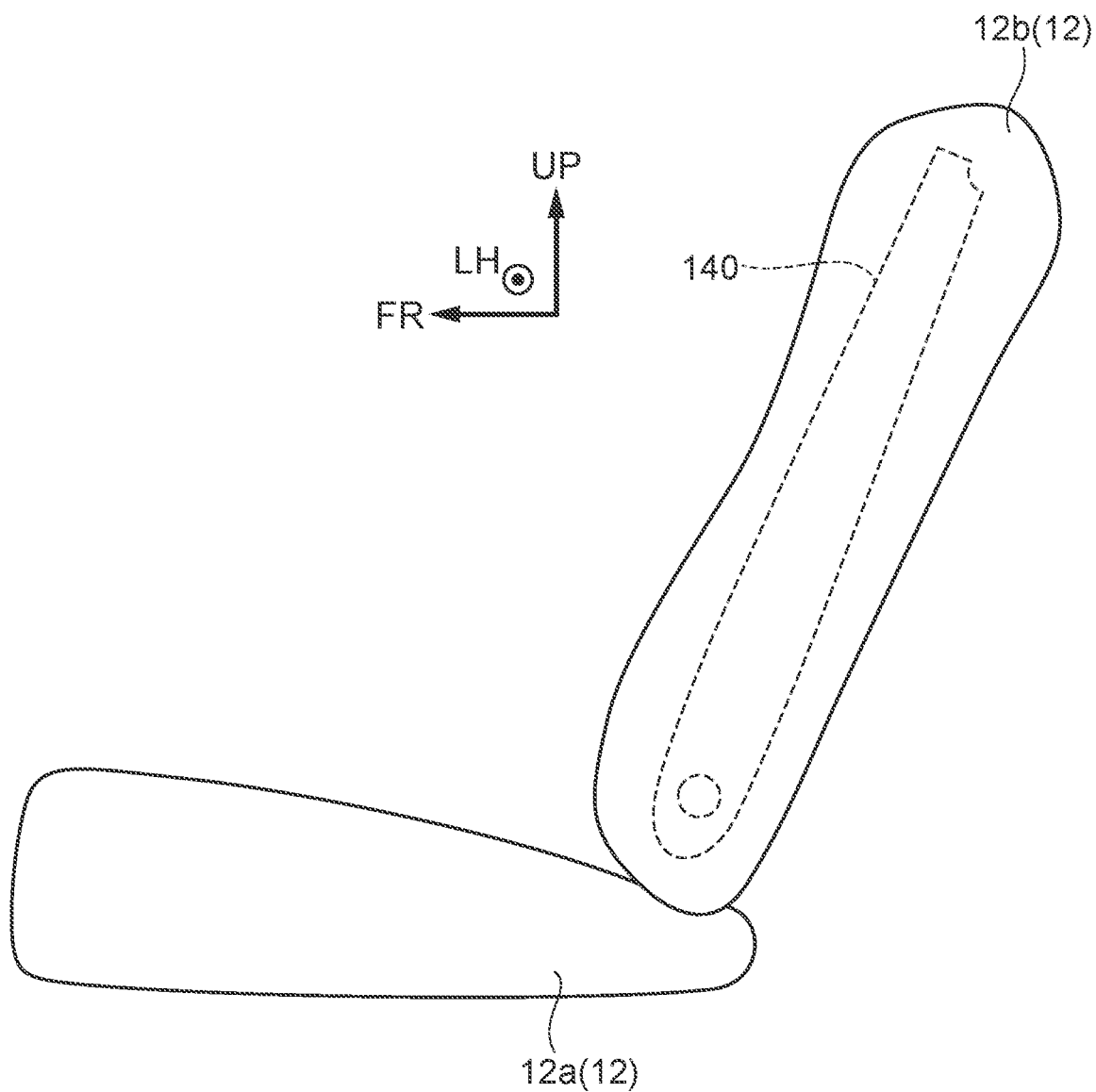
FIG. 10 is a side view illustrating a vehicle seat of a comparative embodiment to an exemplary embodiment as viewed from a width direction left side.

As illustrated in FIG. 7, the seat frame 14 of the present exemplary embodiment is further provided with a configuration (eighth configuration) including the three panel members 50 such that the seatback frame 30 curves so as to protrude toward the front side as viewed along the seat width direction. The seat frame 14 provided with the eighth configuration thereby enables a space to be enlarged at the rear side of the seatback frame 30 in comparison to configurations in which the seatback frame 30 has a profile extending in a straight line (see FIG. 10).

The vehicle seat 10 including the seat frame 14 provided with the first configuration facilitates formation of the complex profile of the vehicle seat 10 in comparison to configurations including the back side frame 140 of the comparative embodiment.

Although a specific exemplary embodiment of the present disclosure has been described in detail above, the present disclosure is not limited to the above exemplary embodiment, and various modifications, variations, and improvements may be implemented within the scope of the technical concept of the present disclosure.

For example, in the present exemplary embodiment, the back side frame 40 is configured including the three panel members 50. However, the number of panel members configuring the columnar body with the closed cross-section in the present disclosure is not limited to three. For example, the number of panel members configuring the columnar body with the closed cross-section in the present disclosure may be two, or may be four or more. In such cases, the number of weld portions of the back side frame 40 will be the same as the number of panel members.

Moreover, in the present exemplary embodiment, the sheet thickness of the outer panel 54 is different to the sheet thickness of the rear panel 52 and the sheet thickness of the inner panel 56. However, the sheet thickness of the outer panel 54 may be the same as the sheet thickness of the rear panel 52 and the sheet thickness of the inner panel 56.

Moreover, in the present exemplary embodiment, the outer panel 54 is formed with the bead portion 54f. However, the panel face of the outer panel 54 may be flat. Alternatively, a bead portion similar to the bead portion 54f may also be formed to the rear panel 52 or to the inner panel 56.

Moreover, in the present exemplary embodiment, the bead portion 54f projects toward the inside of the closed cross-section 42 of the outer panel 54. However, the bead portion 54f may project toward the outside of the closed cross-section 42.

Moreover, in the present exemplary embodiment, the bead portion 54f is formed integrally to the outer panel 54 by pressing. However, the bead portion 54f may be a configured by a separate member to the outer panel 54.

In the present exemplary embodiment, the contact portions 58 are locations where the three panel members 50 are superimposed on the adjacent panel members 50 in the sheet thickness direction as viewed along the seat up-down direction. However, the contact portions 58 may be locations where leading ends of end portions of the adjacent panel members 50 contact each other as viewed along the seat up-down direction.

In the present exemplary embodiment, the weld portion 44a is disposed inside the closed cross-section 42. However, the weld portion 44a may be disposed outside the closed cross-section 42.

In the present exemplary embodiment, the inner panel 56 is formed with the taper portion 56d. However, a front side and seat width direction inside portion of the inner panel 56 may have a right-angled profile as viewed along the seat up-down direction.

In the present exemplary embodiment, the three panel members 50 of the seatback frame 30 are curved so as to protrude toward the front side of the seatback frame 30 as viewed along the seat width direction. However, the three panel members 50 of the seatback frame 30 may be curved so as to protrude toward the rear side of the seatback frame as viewed along the seat width direction, or may have profiles extending along a straight line.

In the present disclosure, the back side frame 40 serving as an example of a columnar body is configured from the three panel members 50. However, the purpose of the columnar body of the present disclosure is not limited to that of the back side frame 40. For example, the columnar body of the present disclosure may be employed as a support column member configuring part of a vehicle body frame in a vehicle.

What is claimed is:

1. A seat frame comprising:
a columnar body comprising:
three or more elongated plate shaped panel members extending in one direction; and
weld portions, a number of which is the same as a number of the panel members, where two width direction end portions of respective panel members out of the three or more panel members are welded together to configure a closed cross-section with a hollow structure.

2. The seat frame of claim 1, wherein the plurality of panel members have different sheet thicknesses to each other.

3. The seat frame of claim 1, wherein the plurality of panel members have different profiles to each other as viewed along the one direction.

4. The seat frame of claim 1, wherein the two width direction end portions of the respective panel members are lap welded to one another.

5. The seat frame of claim 1, wherein at least one panel member out of the panel members is formed with a bead portion extending in the one direction.

6. The seat frame of claim 5, wherein at least one weld portion out of the plurality of weld portions is disposed inside the closed cross-section.

7. A seat frame comprising:
a columnar body comprising:
three or more elongated plate shaped panel members extending in one direction;
weld portions, a number of which is the same as a number of the panel members, where two width direction end portions of respective panel members out of the three or more panel members are welded together to configure a closed cross-section with a hollow structure;
a cushion frame provided with a pair of left and right cushion side frames extending along a seat front-rear direction and disposed in a pair at two seat width direction end portions of the cushion frame; and
a seatback frame provided with the columnar body as at least one back side frame out of a left and right pair of back side frames, the columnar body having one end portion in the one direction coupled to a rear end portion of the corresponding cushion side frame.

8. The seat frame of claim 7, wherein the three or more panel members include:
a rear panel configuring a structure of a portion of the back side frame at a rear side of the seatback frame;
an outer panel configuring a structure of a portion of the back side frame at a width direction outside of the seatback frame; and
an inner panel configuring a structure of a portion of the back side frame at a front side and a width direction inside of the seatback frame, the inner panel including a location, as viewed along the seat up-down direction, inclined toward the width direction inside of the seatback frame on progression from the front side toward the rear side of the seatback frame.

9. The seat frame of claim 7, wherein the seatback frame curves so as to rot toward a front side of the seatback frame as viewed along the seat width direction.

10. A vehicle seat comprising:
a cushion section; and
the seat frame of claim 7 supporting the cushion section.

11. The seat frame of claim 8, wherein a retractor which anchors one end of a belt is disposed at an upper end portion of the back side frame, and a sheet thickness of the outer panel, upon which load acts in a direction along which the belt is drawn across, is greater than a sheet thickness of the rear panel and a sheet thickness of the inner panel.

* * * * *